US008259550B2

(12) United States Patent  
Kuijper et al.

(10) Patent No.: US 8,259,550 B2  
(45) Date of Patent: Sep. 4, 2012

(54) RECORD CARRIER AS WELL AS AN APPARATUS AND METHOD FOR APPLYING IMAGE DATA AS A VISUALLY DETECTABLE PATTERN AT AN OPTICAL RECORD CARRIER

(75) Inventors: Maarten Kuijper, Taipei (TW); Johannes Francicus Petrus Claas, Taipei (TW)

(73) Assignee: Lite-On It Corporation, Taipei (TW)

( * ) Notice: Subject to any disclaimer, the term of this patent is extended or adjusted under 35 U.S.C. 154(b) by 658 days.

(21) Appl. No.: 12/543,229

(22) Filed: Aug. 18, 2009

(65) Prior Publication Data

US 2010/0067348 A1 Mar. 18, 2010

Related U.S. Application Data

(60) Provisional application No. 61/097,476, filed on Sep. 16, 2008.

(51) Int. Cl.  
G11B 20/10 (2006.01)

(52) U.S. Cl. .................................. 369/59.26; 369/59.24

(58) Field of Classification Search .................. None  
See application file for complete search history.

(56) References Cited

U.S. PATENT DOCUMENTS

| 7,263,201 B2 * | 8/2007 | Yntema et al. ............... 382/100 |
| 2004/0095866 A1 * | 5/2004 | Morishima et al. ........ 369/59.24 |
| 2005/0207325 A1 * | 9/2005 | Sako et al. ................. 369/275.3 |

* cited by examiner

*Primary Examiner* — Paul Huber  
(74) *Attorney, Agent, or Firm* — Thomas, Kayden, Horstemeyer & Risley, LLP

(57) ABSTRACT

A method of applying image data as a visually detectable pattern with at least one embedded data element at an optical record carrier is disclosed, comprising the step of physically mapping at least one channel symbol onto the record carrier, the channel symbol being selected from a set of mutually different channel symbols, the channel symbols each comprising an area of size s1 with a relatively low value v1 for an optical property and an area with size s2 with a relatively high value v2 for said optical property, the channel symbols being distributed over a plurality of subsets each having a plurality of channel symbols wherein the plurality of channel symbols within a subset have a distance that is substantially less than the distance between channel symbols of mutually different subsets, wherein the distance between two channel symbols is defined as the absolute difference between the ratios s1/(s1+s2). wherein the step of selecting comprises the step of determining a subset on the basis of the image data to be mapped in the visually detectable pattern and selecting one symbol from that subset on the basis of the at least one data symbol to be mapped. The invention further includes an apparatus, and a record carrier.

15 Claims, 18 Drawing Sheets

| primary data | codeword | Contrast enhancement code |||||||| 
| | | b7 | b6 | b5 | b4 | b3 | b2 | b1 | b0 |
| --- | --- | --- | --- | --- | --- | --- | --- | --- | --- |
| 0x0 | 0x05 | 0 | 0 | 0 | 0 | 0 | 1 | 0 | 1 |
| 0x1 | 0x09 | 0 | 0 | 0 | 0 | 1 | 0 | 0 | 1 |
| 0x2 | 0x0A | 0 | 0 | 0 | 0 | 1 | 0 | 1 | 0 |
| 0x3 | 0x11 | 0 | 0 | 0 | 1 | 0 | 0 | 0 | 1 |
| 0x4 | 0x12 | 0 | 0 | 0 | 1 | 0 | 0 | 1 | 0 |
| 0x5 | 0x14 | 0 | 0 | 1 | 0 | 0 | 1 | 0 | 0 |
| 0x6 | 0x21 | 0 | 0 | 1 | 0 | 0 | 0 | 0 | 1 |
| 0x7 | 0x22 | 0 | 0 | 1 | 0 | 0 | 0 | 1 | 0 |
| 0x8 | 0x24 | 0 | 0 | 1 | 0 | 0 | 1 | 0 | 0 |
| 0x9 | 0x28 | 0 | 0 | 1 | 0 | 1 | 0 | 0 | 0 |
| 0xA | 0x41 | 0 | 1 | 0 | 0 | 0 | 0 | 0 | 1 |
| 0xB | 0x42 | 0 | 1 | 0 | 0 | 0 | 0 | 1 | 0 |
| 0xC | 0x44 | 0 | 1 | 0 | 0 | 0 | 1 | 0 | 0 |
| 0xD | 0x48 | 0 | 1 | 0 | 0 | 1 | 0 | 0 | 0 |
| 0xE | 0x50 | 0 | 1 | 0 | 1 | 0 | 0 | 0 | 0 |
| 0xF | 0x18 | 0 | 0 | 0 | 1 | 1 | 0 | 0 | 0 |

| Primary data | Contrast Code word | Contrast code bits |   |   |   |   |   |   |   |   |   |   |
|---|---|---|---|---|---|---|---|---|---|---|---|---|
| 0x00 | 0x0009 | 0 | 0 | 0 | 0 | 0 | 0 | 0 | 1 | 0 | 0 | 1 |
| 0x01 | 0x0011 | 0 | 0 | 0 | 0 | 0 | 0 | 1 | 0 | 0 | 0 | 1 |
| 0x02 | 0x0012 | 0 | 0 | 0 | 0 | 0 | 0 | 1 | 0 | 0 | 1 | 0 |
| 0x03 | 0x0021 | 0 | 0 | 0 | 0 | 0 | 1 | 0 | 0 | 0 | 0 | 1 |
| 0x04 | 0x0022 | 0 | 0 | 0 | 0 | 0 | 1 | 0 | 0 | 0 | 1 | 0 |
| 0x05 | 0x0024 | 0 | 0 | 0 | 0 | 0 | 1 | 0 | 0 | 1 | 0 | 0 |
| 0x06 | 0x0041 | 0 | 0 | 0 | 0 | 1 | 0 | 0 | 0 | 0 | 0 | 1 |
| 0x07 | 0x0042 | 0 | 0 | 0 | 0 | 1 | 0 | 0 | 0 | 0 | 1 | 0 |
| 0x08 | 0x0044 | 0 | 0 | 0 | 0 | 1 | 0 | 0 | 0 | 1 | 0 | 0 |
| 0x09 | 0x0048 | 0 | 0 | 0 | 0 | 1 | 0 | 0 | 1 | 0 | 0 | 0 |
| 0x0A | 0x0081 | 0 | 0 | 0 | 1 | 0 | 0 | 0 | 0 | 0 | 0 | 1 |
| 0x0B | 0x0082 | 0 | 0 | 0 | 1 | 0 | 0 | 0 | 0 | 0 | 1 | 0 |
| 0x0C | 0x0084 | 0 | 0 | 0 | 1 | 0 | 0 | 0 | 0 | 1 | 0 | 0 |
| 0x0D | 0x0088 | 0 | 0 | 0 | 1 | 0 | 0 | 0 | 1 | 0 | 0 | 0 |
| 0x0E | 0x0090 | 0 | 0 | 0 | 1 | 0 | 0 | 1 | 0 | 0 | 0 | 0 |
| 0x0F | 0x0101 | 0 | 0 | 1 | 0 | 0 | 0 | 0 | 0 | 0 | 0 | 1 |

| Primary data | Contrast Code word | Contrast code bits | | | | | | | | | | | | | | |
|---|---|---|---|---|---|---|---|---|---|---|---|---|---|---|---|---|
| | | b14 | b13 | b12 | b11 | b10 | b9 | b8 | b7 | b6 | b5 | b4 | b3 | b2 | b1 | b0 |
| 0x00 | 0x0021 | 0 | 0 | 0 | 0 | 0 | 0 | 0 | 0 | 0 | 1 | 0 | 0 | 0 | 0 | 1 |
| 0x01 | 0x0041 | 0 | 0 | 0 | 0 | 0 | 0 | 0 | 0 | 1 | 0 | 0 | 0 | 0 | 0 | 1 |
| 0x02 | 0x0042 | 0 | 0 | 0 | 0 | 0 | 0 | 0 | 0 | 1 | 0 | 0 | 0 | 0 | 1 | 0 |
| 0x03 | 0x0081 | 0 | 0 | 0 | 0 | 0 | 0 | 0 | 1 | 0 | 0 | 0 | 0 | 0 | 0 | 1 |
| 0x04 | 0x0082 | 0 | 0 | 0 | 0 | 0 | 0 | 0 | 1 | 0 | 0 | 0 | 0 | 0 | 1 | 0 |
| 0x05 | 0x0084 | 0 | 0 | 0 | 0 | 0 | 0 | 0 | 1 | 0 | 0 | 0 | 0 | 1 | 0 | 0 |
| 0x06 | 0x0101 | 0 | 0 | 0 | 0 | 0 | 0 | 1 | 0 | 0 | 0 | 0 | 0 | 0 | 0 | 1 |
| 0x07 | 0x0102 | 0 | 0 | 0 | 0 | 0 | 0 | 1 | 0 | 0 | 0 | 0 | 0 | 0 | 1 | 0 |
| 0x08 | 0x0104 | 0 | 0 | 0 | 0 | 0 | 0 | 1 | 0 | 0 | 0 | 0 | 0 | 1 | 0 | 0 |
| 0x09 | 0x0108 | 0 | 0 | 0 | 0 | 0 | 0 | 1 | 0 | 0 | 0 | 0 | 1 | 0 | 0 | 0 |
| 0x0A | 0x0201 | 0 | 0 | 0 | 0 | 0 | 1 | 0 | 0 | 0 | 0 | 0 | 0 | 0 | 0 | 1 |
| 0x0B | 0x0202 | 0 | 0 | 0 | 0 | 0 | 1 | 0 | 0 | 0 | 0 | 0 | 0 | 0 | 1 | 0 |
| 0x0C | 0x0204 | 0 | 0 | 0 | 0 | 0 | 1 | 0 | 0 | 0 | 0 | 0 | 0 | 1 | 0 | 0 |
| 0x0D | 0x0208 | 0 | 0 | 0 | 0 | 0 | 1 | 0 | 0 | 0 | 0 | 0 | 1 | 0 | 0 | 0 |
| 0x0E | 0x0210 | 0 | 0 | 0 | 0 | 0 | 1 | 0 | 0 | 0 | 0 | 1 | 0 | 0 | 0 | 0 |
| 0x0F | 0x0401 | 0 | 0 | 0 | 0 | 1 | 0 | 0 | 0 | 0 | 0 | 0 | 0 | 0 | 0 | 1 |

RECORD CARRIER AS WELL AS AN APPARATUS AND METHOD FOR APPLYING IMAGE DATA AS A VISUALLY DETECTABLE PATTERN AT AN OPTICAL RECORD CARRIER

CROSS REFERENCE TO RELATED APPLICATION

This application claims the benefit of priority under 35 U.S.C Section 119 from U.S. Provisional Patent Application Ser. No. 61/097,476, filed on Sep. 16, 2008.

BACKGROUND OF THE INVENTION

1. Field of the Invention

The present invention relates to a method of applying image data as a visually detectable pattern with at least one embedded data element at an optical record carrier.

The present invention further relates to an apparatus for applying image data as a visually detectable pattern with at least one embedded data element at an optical record carrier.

The present invention still further relates to an optical record carrier having applied thereon image data in the form of a visually detectable pattern with at least one embedded data element.

2. Related Art

A visually detectable pattern comprises for example a logo, a sequence of characters or a combination thereof. The visually detectable pattern is printed at a resolution suitable for detection by the human visual system. For example the visually detectable pattern may be printed at a resolution of 1 to several hundreds dots per $mm^2$ (as compared to computer readable data, which is stored at the record carrier at a resolution in the order of several $Mbits/mm^2$). In this way, a user does not need a reading device to recognize the contents of the optical disk, but a simple visual inspection suffices. Such a visually detectable pattern can also serve as a means to detect the authenticity of the record carrier.

It is desired that the visually detectable pattern is applied at the side of the record carrier that also accommodates the regular data, to facilitate that the visually detectable pattern can be applied by the same means as such regular data.

A method and a device for providing a watermark at a record carrier is disclosed in EP 1,710,896. According to the method described therein, a parameter of the channel code is controlled to introduce a predetermined run-length distribution. In particular said parameter is the choice of the merging bits used in the channel code. Although this results in a visually detectable pattern, the contrast is very weak. There is a need to apply a visually detectable pattern at an optical record carrier having a reasonable contrast while allowing data to be embedded in the visually detectable pattern.

SUMMARY OF THE INVENTION

According to a first aspect of the invention, a method of applying image data as a visually detectable pattern with at least one embedded data element at an optical record carrier is provided, comprising the step of physically mapping at least one channel symbol onto the record carrier, the channel symbol being selected from a set of mutually different channel symbols, the channel symbols each comprising an area of size s1 with a relatively low value v1 for an optical property and an area with size s2 with a relatively high value v2 for said optical property, the channel symbols being distributed over a plurality of subsets each having a plurality of channel symbols, wherein the plurality of channel symbols within a subset have a distance that is substantially less than the distance between channel symbols of mutually different subsets, wherein the distance between two channel symbols is defined as the absolute difference between the ratios s1/(s1+s2). Wherein the step of selecting comprises the step of determining a subset on the basis of the image data to be mapped in the visually detectable pattern and selecting one symbol from that subset on the basis of the at least one data symbol to be mapped.

Instead of using symbols comprising only one area of size s1 with a relatively low value v1 for an optical property and one area with size s2 with a relatively high value v2 for said optical property, more complex symbols may be used. For example a first symbol may comprise subsequently an area of size s11 with a relatively low value v1, an area of size s21 with a relatively high value v2, an area of size s12 with a relatively low value v1, and an area of size s22 with a relatively high value v2. By way of example such a symbol may have a constant width and its areas of size s11, s21, s12, s22 with a length of 3T, 14T, 4T, 14T. In that case, where the symbol is composed of more than one area of a particular optical property, the value for s1 will be determined as the sum of the values s11, s12 for its constituting areas, and likewise the value for s2 will be determined as the sum of the values s21, s22 for its constituting areas.

In an embodiment, the subsets of symbols used to represent the visually detectable pattern with embedded data comprise symbols having a runlength within a runlength range of a set of channel codewords used for storage of regular data at another part of the record carrier. For example, in case the regular data is stored according to an EFM+ channel code, the length of areas having a particular value for the optical property, is in a range of 3 to 14 length units. It is not necessary that the length is an integer value. For example a symbol having a first area with a length of 12.5 units with a relatively low value v1 for an optical property and a second area with a length of 4.5 units with a relatively high value v2 for said optical property may be used.

According to a further aspect of the invention, an apparatus for writing image data as a visually detectable pattern with at least one embedded data element at an optical record carrier, comprising a facility for physically mapping the at least one data element as a channel symbol onto the record carrier, the channel symbol being selected from a set of mutually different channel symbols, the channel symbols each comprising an area of size s1 with a relatively low value v1 for an optical property and an area with size s2 with a relatively high value v2 for said optical property, the channel symbols being distributed over a plurality of subsets each having a plurality of channel symbols wherein the plurality of channel symbols within a subset have a distance that is substantially less than the distance between channel symbols of mutually different subsets, wherein the distance between two channel symbols is defined as the absolute difference between the ratios s1/(s1+s2). Wherein the step of selecting comprises the step of determining a subset on the basis of the image data to be mapped in the visually detectable pattern and selecting one symbol from that subset on the basis of the at least one data symbol to be mapped.

In this way a record carrier according to a further aspect of the present invention is obtained that comprises a zone with a visually detectable pattern composed of channel symbols, the channel symbol being selected from a set of mutually different channel symbols, the channel symbols each comprising an area of size s1 with a relatively low value v1 for an optical property and an area with size s2 with a relatively high value v2 for said optical property, the channel symbols being distributed over a plurality of subsets, each having a plurality of channel symbols, wherein the plurality of channel symbols within a subset have a distance that is substantially less than the distance between channel symbols of mutually different subsets, wherein the distance between two channel symbols is defined as the absolute difference between the ratios $s1/(s1+s2)$.

As the plurality of channel symbols within a subset has a distance that is substantially less than the distance between channel symbols of mutually different subsets, the embedded data can be present in the visually detectable pattern without disturbing the appearance of the pattern to the user.

According to a further aspect of the invention, a method for reading an optical record carrier according to the invention is provided, comprising the steps:

a) converting a sequence of channel symbols arranged in the visually detectable pattern into a signal, b) identifying at least one symbol, and c) detecting to which subset of symbols the identified symbol corresponds, d) detecting to which symbol of said subset the identified symbol corresponds, e) reconstructing image data on the basis of the detection in step c), and f) reconstructing at least one data element on the basis of the detection in step d).

Additionally, according to a still further aspect of the invention, an apparatus for reading an optical record carrier according to the invention is provided comprising:

a facility for converting a sequence of channel symbols arranged in the visually detectable pattern into a signal, a facility for identifying at least one symbol, a subset detecting facility for detecting to which subset of symbols the identified symbol corresponds, a symbol detecting facility for detecting to which symbol of said subset the identified symbol corresponds, a facility for reconstructing image data on the basis of the result of the subset detecting facility, and a facility for reconstructing at least one data element on the basis of the result of the symbol detecting facility.

Apparatus for reading may comprise a further facility for calculating at least one of a run length distribution, an asymmetry measure and the peak and bottom values from the signal generated by the first facility. As described in the copending Application P85850US00, in this way a digital representation can be obtained from the visually detectable pattern by simple means.

The optical record carrier may for example be an optical disc, e.g. one of the types CD-R, CD-RW, DVD+/−R, DVD+/−RW, BD-R, BD-RE, or HD-DVD. [DVD-RAM] Alternatively the optical record carrier may be another medium that can be read out with optical means, e.g. a credit card CD, provided that the data is arranged on such an optical record carrier as in an optical disc, i.e. spirally or concentrically arranged around a centre of rotation.

Various recording modes are possible at basic format level, e.g. disc at once, multi-session, sequential with or without logical overwrite and random.

BRIEF DESCRIPTION OF THE DRAWINGS

These and other aspects are described in more detail with reference to the drawing. Therein:

FIG. 5A shows a first embodiment of a contrast enhancement code, FIG. 5B shows a second embodiment of a contrast enhancement code, FIG. 5C shows a third embodiment of a contrast enhancement code.

DETAILED DESCRIPTION OF EMBODIMENTS

Figure 1:
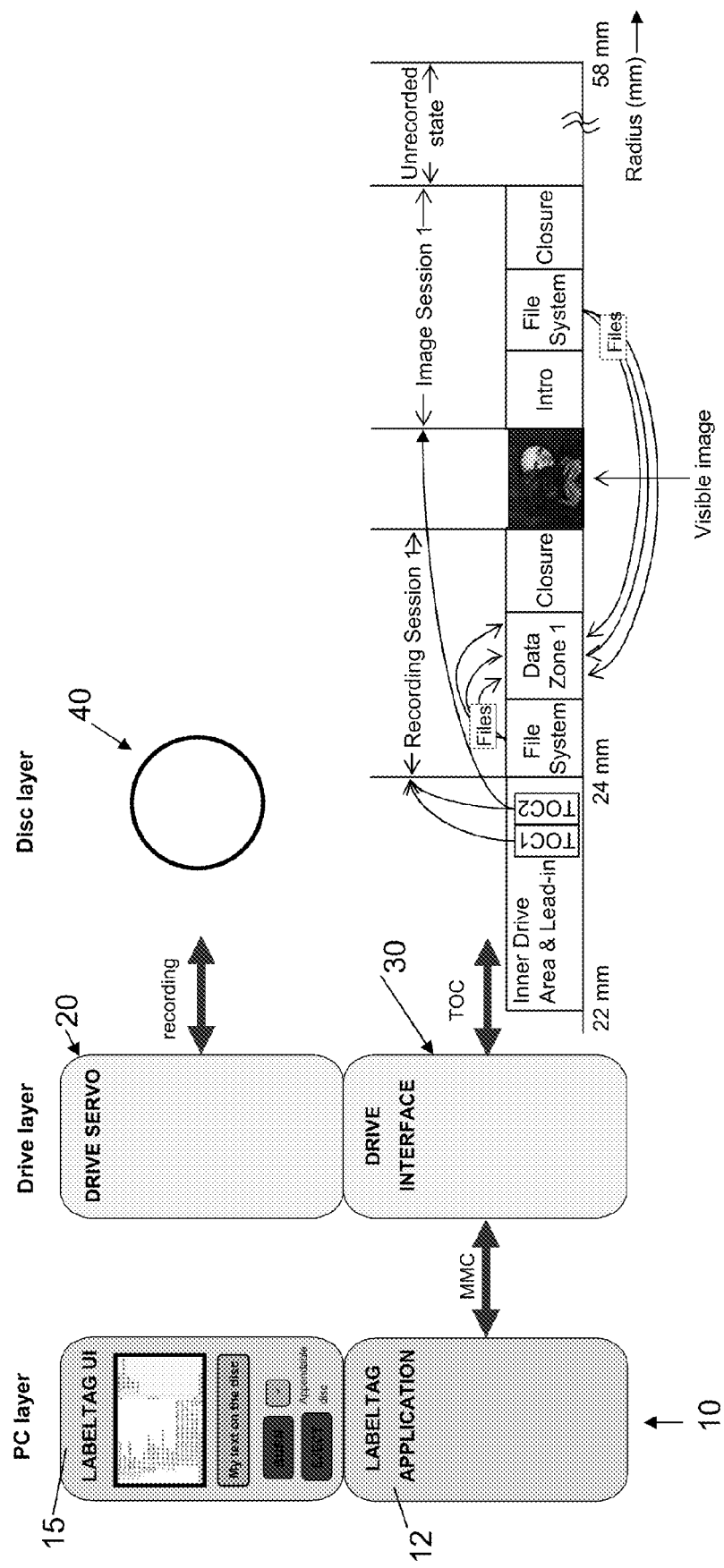
FIG. 1 shows an overview of a system for applying a visually detectable pattern at a record carrier.

In the following detailed description, numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All publications, patent applications, patents, and other references mentioned herein are incorporated by reference in their entirety. In case of conflict, the present specification, including definitions, will control. In addition, the materials, methods, and examples are illustrative only and not intended to be limiting.

FIG. 1 presents an overview is presented of a system arranged for applying a visual detectable pattern at an optical record carrier 40. At the highest level, the system comprises a host module and a drive-module. The host module controls the location of regular user data including the structure of a file system, wherein the regular data is organized and is responsible for closes and appends operations of the optical record carrier 40. The host module may further provide for a user interface 15 that facilitates the user to enter image data to be applied on the record carrier 40, e.g. a name or a LOGO. Alternatively the host module may autonomously calculate image data to be applied at the disc, for example an image that indicates the date of recording may be applied as the visually detectable pattern. In the host module, a bit-map representation is generated, for example from the user data provided via the user interface 15. The host module then sends print commands with the pixel information of the image to the drive-module. This aspect is described in more detail in earlier filed application P82011US00 filed as provisional application U.S. 60/954,490. The drive-module on its turn has a drive interface part 30 and a drive servo part 20. The drive interface 30 part handles the print commands issued by the host 10 and records the regular data, including session lead in, closures, intro and lead out. The drive interface part 30 takes care of the interpretation of the pixel information and location of the image on the disc. The drive servo part 20 finally records the pixel information on the correct location including the encoded line numbering. The drive servo part 20 controls the record power, motor frequency, pixel frequency and channel bit frequency.

Figure 2:
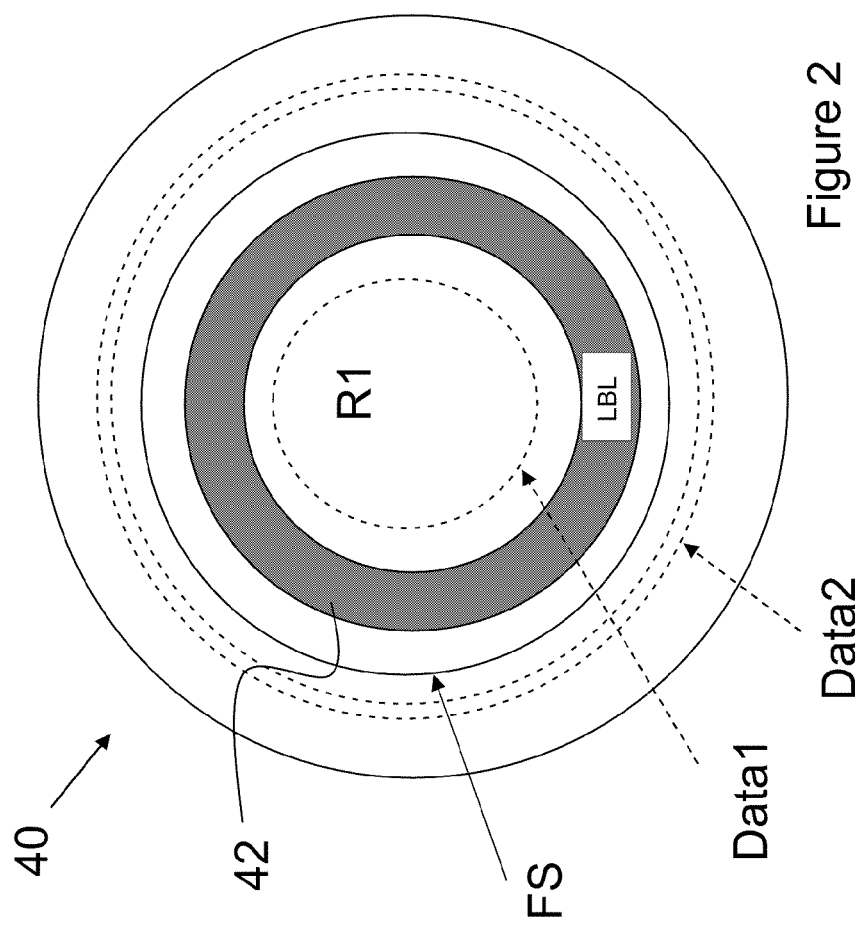
FIG. 2 shows a record carrier according to the invention with a visually detectable pattern.

FIG. 2 shows in more detail a record carrier 40 comprising a zone 42 with a visually detectable pattern LBL. In the embodiment shown the record carrier 40 further comprises a first and a second data zone data1, data2 and a file system FS. The visually detectable pattern LBL is for example a text or an image that is indicative for the content of the disc, a date of recording, or the name of the owner.

Figure 3:
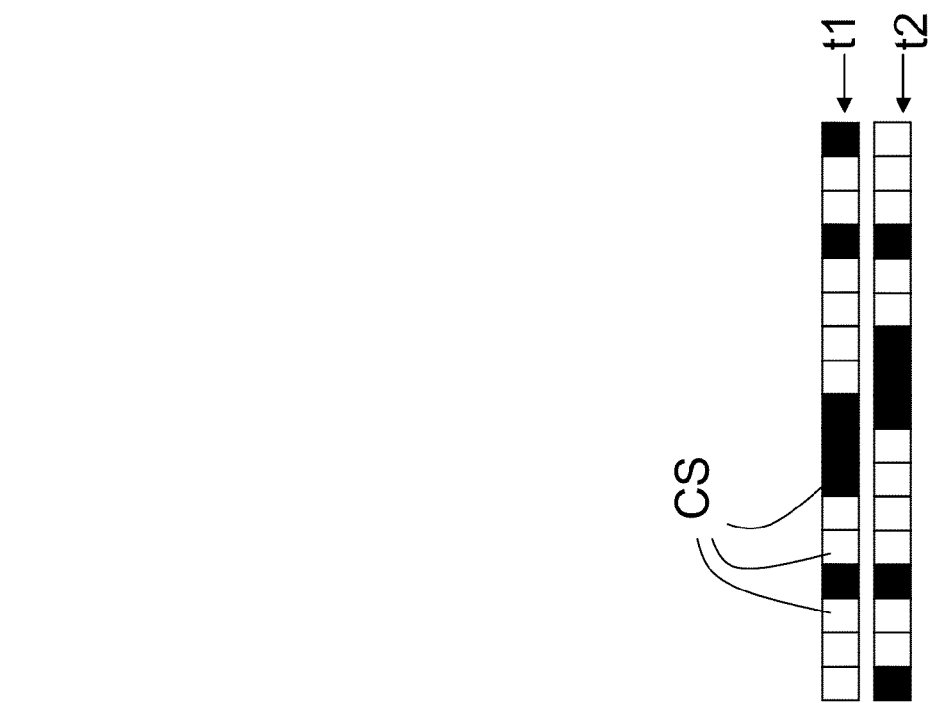
FIG. 3 shows a detail of the pattern shown in FIG. 2.

As shown in FIG. 3 which shows a linearized portion comprising two tracks t1, t2 within the zone 42, the visually detectable pattern is a pattern of channel symbols CS. The symbols are selected from a set of mutually different channel symbols. The channel symbols each comprise an area of size s1 with a relatively low value v1 for an optical property and an area with size s2 with a relatively high value v2 for said optical property. The channel symbols are distributed over a plurality of subsets each having a plurality of channel symbols, wherein the plurality of channel symbols within a subset have a distance that is substantially less than the distance between channel symbols of mutually different subsets, wherein the distance D between two channel symbols is defined as the absolute difference between the ratios $s1/(s1+s2)$.

The symbols within the same subset have substantially the same appearance in the visually detectable pattern. Nevertheless, all symbols can be optically discriminated from each other by machine-reading means. In this way a visually detectable pattern can be represented at the record carrier by a selection between the subsets controlled by the image data to be represented in the visually detectable pattern and by a selection of a particular symbol within the selected subset on the basis of the data to be embedded. As the distance between symbols within the same subset is always less than the distance between symbols of different subsets, the appearance of the visually detectable pattern is substantially undisturbed by the presence of the embedded data.

In the sequel, it is presumed for clarity that the areas having the low value and the high value for the optical property substantially have the same width so that their size is determined by their length. For clarity it will further be assumed that the optical property is the reflectivity. Nevertheless, in other embodiments, the size of the areas may (additionally) be determined by their width as illustrated with reference to FIGS. 12A-12C. Likewise other parameters may be selected as the optical property, e.g. the absorption. In again another embodiment, the optical property may be the extent to which the area reflects light having a particular polarization.

FIG. 4A-4E shows various examples of sets of channel symbols that are suitable to form the visible pattern in the optical record carrier according to the present invention.

Figure 4A:
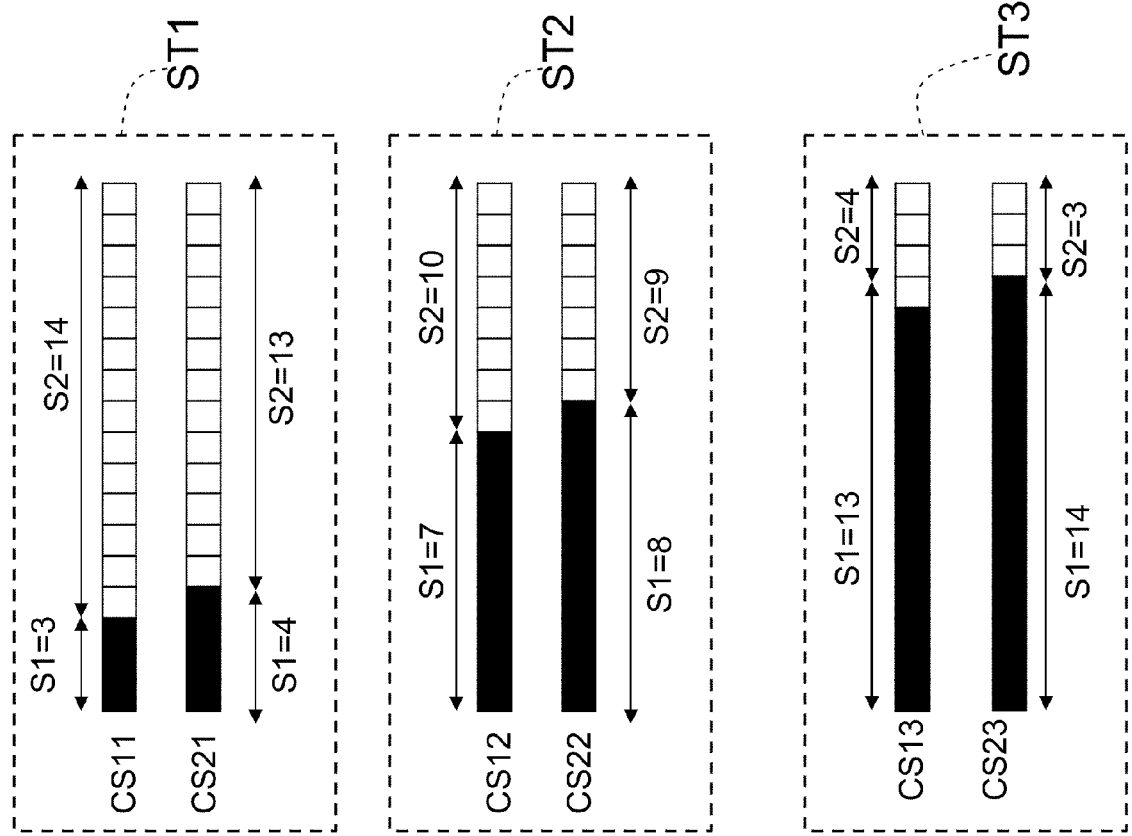
FIG. 4A shows a first embodiment of a channel code used to apply the visually detectable pattern with the embedded data.

FIG. 4A shows a first embodiment. In this case the, symbols are distributed over three subsets ST1, ST2, ST3. Each subset has two symbols, CS11, CS21; CS12, CS22 and CS13, CS23 respectively. The first subset ST1 comprises a first channel symbol CS11 having an area of length s1=3 with a relatively low value v1 for an optical property and an area of length s2=14 with a relatively high value v2 for said optical property. The first subset ST1 has a second channel symbol with an area of length s1=4 with a relatively low value v1 for an optical property and an area of length s2=13 with a relatively high value v2. The length s1, s2 is expressed as number length units, a length unit having a predetermined size that depends on the accuracy of the means with which the data is written on the optical record carrier. The second subset has symbol CS12 with s1=7, s2=10 and CS22 with s1=8, s2=9. The third subset has symbol CS13 with s1=13, s2=4 and CS23 with s1=14, s2=3.

The mutual distance between two symbols CS, CS' is defined as $$D(CS, CS') = \left| \frac{s1}{s1+s2} - \frac{s1'}{s1'+s2'} \right|,$$

wherein s1, s2 are the sizes of the areas with the relatively low value of the optical property and with the relatively high value of the optical property respectively for the symbol CS, and s1', s2' are the corresponding values for the symbol CS'.

In this case the distance D between two symbols within each subset is 0.059, while the minimal distance between symbols of different sets (e.g. between CS21 and CS12) is 0.18, which is three times greater. In this embodiment a visually detectable pattern having three graylevels having one embedded databit per channel symbol can be encoded.

Figure 4B:
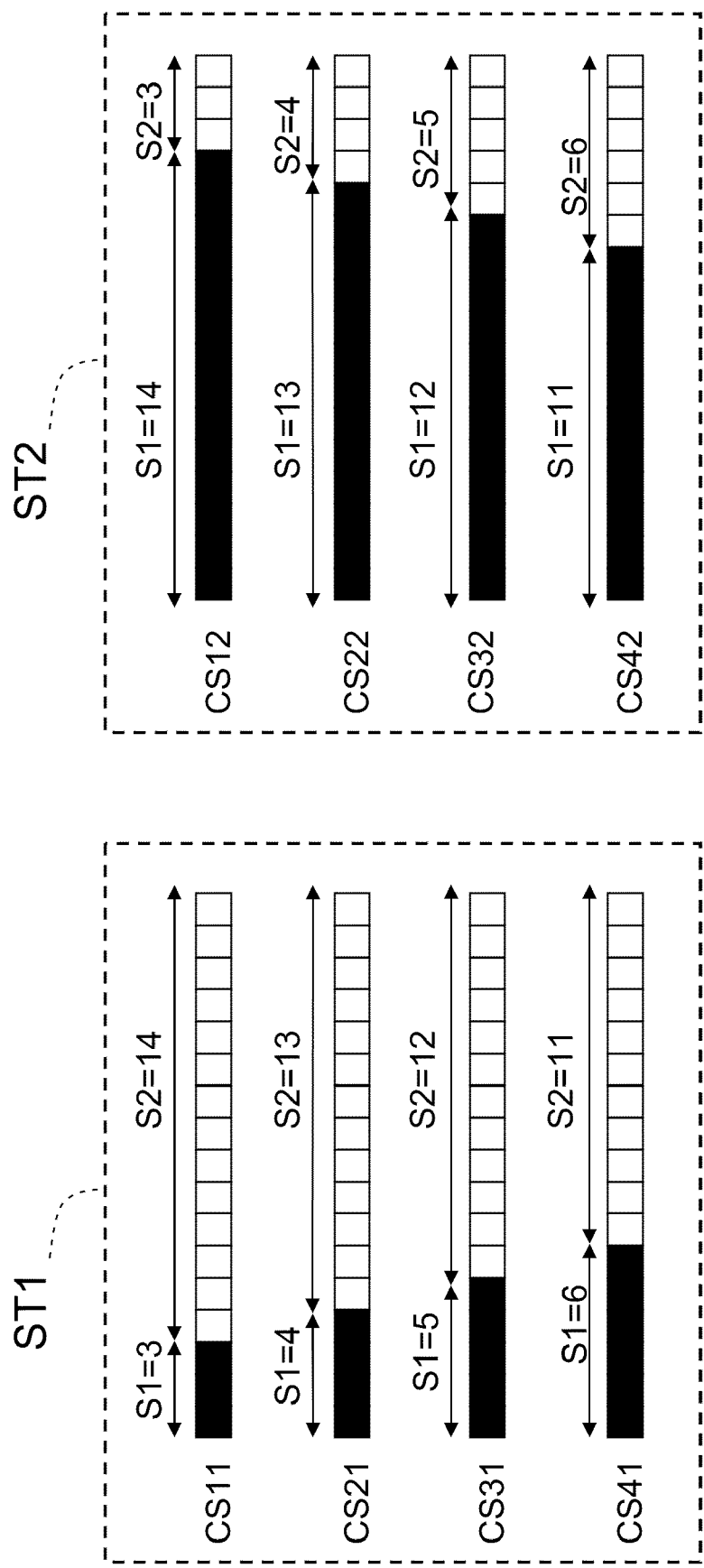
FIG. 4B shows a second embodiment of a channel code used to apply the visually detectable pattern with the embedded data.

FIG. 4B shows a second embodiment wherein the symbols are distributed over two subsets, each having four symbols. The first subset ST1 has symbols CS11 with s1=3, s2=14, CS21 with s1=4, s2=13, CS31 with s1=5, s=12 and CS41 with s1=6, s2=11. The second subset ST2 has symbols CS12 with s1=14, s2=3, CS22 with s1=13, s2=4, CS32 with s1=12, s2=5 and CS42 with s1=11, s2=6. In this case maximum distance between two symbols within the same subset is 0.18, while the minimum distance between any pair of symbols from mutually different subsets is 0.29. In this embodiment a binary image having embedded two bits per pixel may be mapped as the visually detectable pattern.

Figure 4C:
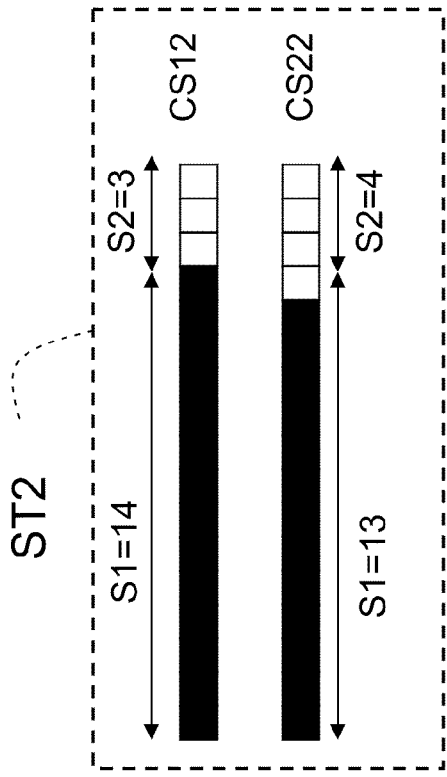
FIG. 4C shows a third embodiment of a channel code used to apply the visually detectable pattern with the embedded data.
Figure 4C:
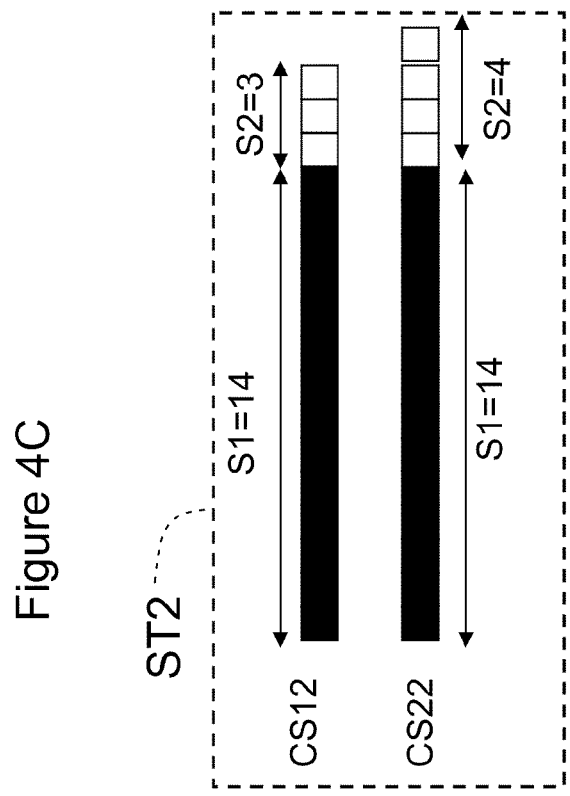

FIG. 4C shows a third embodiment. Therein the first subset ST1 comprises a pair of channel symbols CS11 with s1=3, s2=14 and CS21 with s1=4, s2=13. The second subset ST2 of symbols comprises a first symbol CS12 with s1=14, s2=3 and a second symbol CS22 with s1=13 and s2=4.

The distance D between the symbols CS11 and CS21 is 0.059. Likewise the distance between the symbols CS12 and CS22 is 0.059. This is substantially less than the distance between any two symbols between different sets. The latter distance is minimally the distance between the symbols CS21 and CS22, which is 0.53.

In the embodiment shown in FIG. 4C, the plurality of subsets of symbols is two and the plurality of symbols within each subset is two. The first ST1 of the two subsets of symbols comprises symbols having a value for s1 less than s2, and the second ST2 of the two subsets of symbols comprises symbols having a value for s1 greater than s2.

The minimum value MAX of s2 for all symbols in the first subset ST1 and of s1 for all symbols in the second subset ST2 is 13 in this embodiment.

The maximum value MIN of s1 for all symbols in the first subset ST1 and of s2 for all symbols ST2 in the second subset is 4.

Accordingly the ratio $$\frac{\text{MAX} - \text{MIN}}{\text{MAX} + \text{MIN}} = 0.52$$

So that the symbols comply with the following relation:

$$\frac{\text{MAX} - \text{MIN}}{\text{MAX} + \text{MIN}} \geq 0.4, \text{ wherein}$$

A value higher than 0.4 of this ratio is particularly attractive for media having a relatively small difference between the relatively low value for the optical property and the relatively high value for the optical property.

Figure 4D:
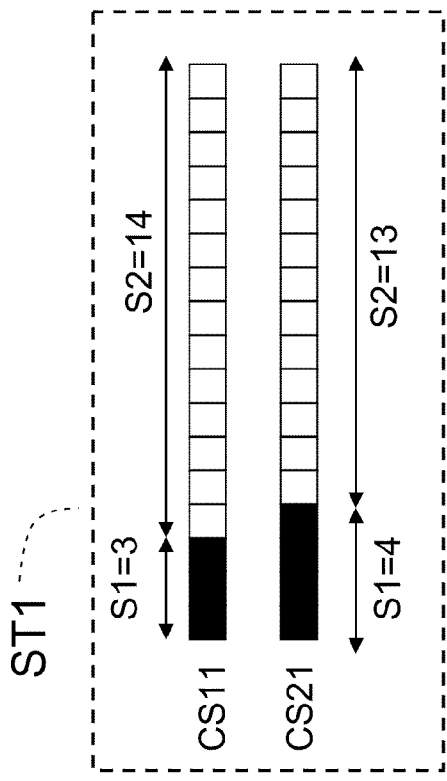
FIG. 4D shows a fourth embodiment of a channel code used to apply the visually detectable pattern with the embedded data.
Figure 4D:
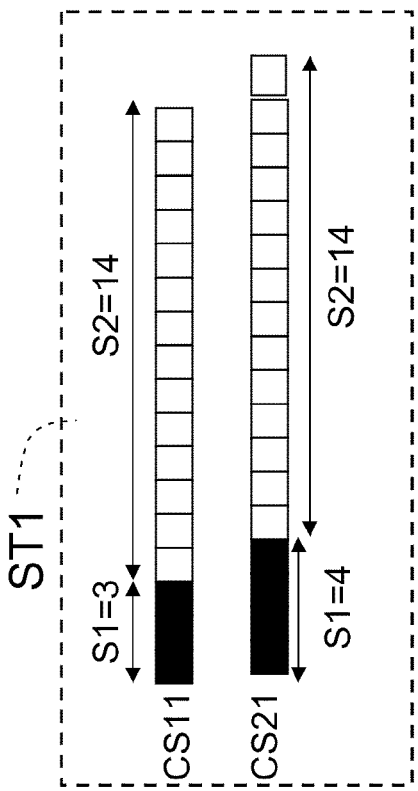

In the embodiments shown the EFM channel code used for DVD is presumed, having a symbol length of 14 is presumed. Alternatively the EFM channel code for CD with runlength 14 or the 17PP channel code used for BD may be used. Alternatively another channel coding may be used having symbols in the form of an area of size s1 with a relatively low value v1 for an optical property and an area with size s2 with a relatively high value v2 for said optical property. One example thereof is shown in FIG. 4D. There the symbols CS11 and CS21 of the first subset ST1 have different length, 17 and 18 units respectively. Likewise the symbols CS12 and CS22 of the second subset ST2 have a different length.

Figure 4E:
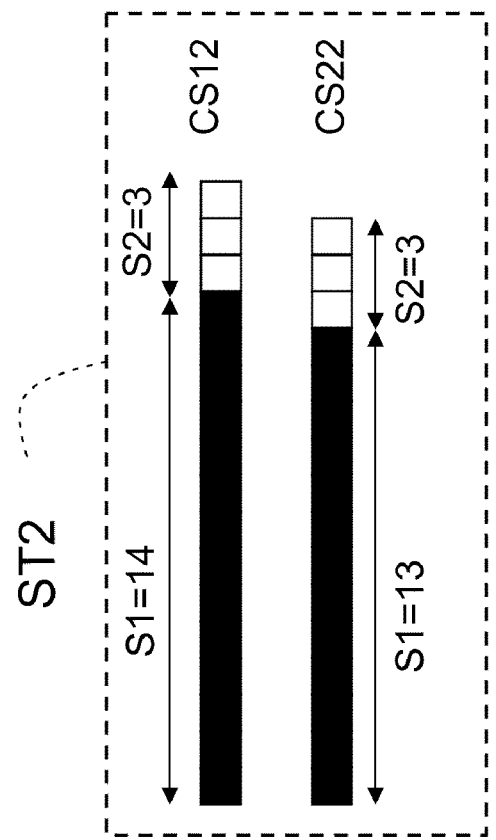
FIG. 4E shows a fifth embodiment of a channel code used to apply the visually detectable pattern with the embedded data.
Figure 4E:
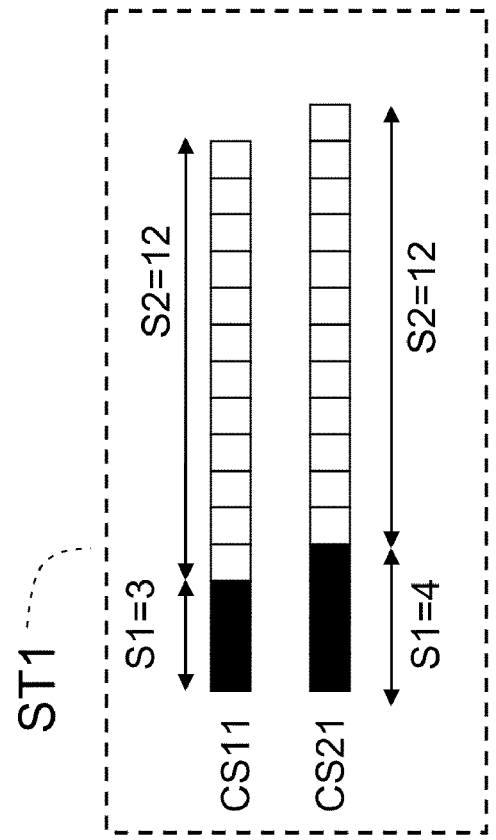

Alternatively another channel coding may be used having symbols in the form of an area of size s1 with a relatively low value v1 for an optical property and an area with size s2 with a relatively high value v2 for said optical property in which symbols of different subsets have different length. One example thereof is shown in FIG. 4E. There the first symbol CS11 of the first subset and the first symbol CS12 of the second subset have different length, 15 and 17 units respectively. The second symbol CS21 of the first subset and the second symbol CS22 of the second subset have an equal length of 16 units.

The following table summarizes various properties for the channel codes shown in FIG. 4A-4E as well as for various other examples. Therein MAX is the minimum value of s2 for all symbols in the first subset ST1 and of s1 for all symbols in the second subset ST2, and MIN is the maximum value of s1 for all symbols in the first subset ST1 and of s2 for all symbols in the second subset ST2.

Furthermore R is given by:

$$R = \frac{\text{MAX} - \text{MIN}}{\text{MAX} + \text{MIN}}$$

The columns D1121, D1222 and D2122 indicate the distances.

Therein $$D1121 = \left| \left( \frac{s1}{s1+s2} \right)_{CS11} - \left( \frac{s1}{s1+s2} \right)_{CS21} \right|,$$

which is the mutual distance between symbols of the first subset. Likewise D1222 is the mutual distance between symbols of the second subset. Furthermore D2122 is the distance between the mutually symbols of the first and the second subset.

As can be seen in this table for each of the embodiments, the ratio R is greater than 0.4 and the distance D2122 is substantially larger than the distances D1121 and D1222.

| | ST1 | | | | ST2 | | | | | | | | |
|---|---|---|---|---|---|---|---|---|---|---|---|---|---|
| | CS11 | | CS21 | | CS12 | | CS22 | | | | | | |
| Format | s1 | s2 | s1 | s2 | s1 | s2 | s1 | s2 | MAX | MIN | R | D1121 | D1222 | D2122 |
| EFM+ | 3 | 14 | 4 | 13 | 14 | 3 | 13 | 4 | 13 | 4 | 0.529412 | 0.058824 | 0.058824 | 0.529412 |
| EFM + a1 | 3 | 14 | 4 | 14 | 14 | 3 | 14 | 4 | 14 | 4 | 0.555556 | 0.045752 | 0.045752 | 0.555556 |
| EFM + a2 | 3 | 14 | 3 | 13 | 14 | 3 | 13 | 3 | 13 | 3 | 0.625 | 0.011029 | 0.011029 | 0.625 |
| BD | 2 | 9 | 3 | 8 | 9 | 2 | 8 | 3 | 8 | 3 | 0.454545 | 0.090909 | 0.090909 | 0.454545 |
| BDa1 | 2 | 9 | 3 | 9 | 9 | 2 | 9 | 3 | 9 | 3 | 0.5 | 0.068182 | 0.068182 | 0.5 |
| BDa2 | 2 | 9 | 2 | 8 | 9 | 2 | 8 | 2 | 8 | 2 | 0.6 | 0.018182 | 0.018182 | 0.6 |
| CD | 3 | 11 | 4 | 10 | 11 | 3 | 10 | 4 | 10 | 4 | 0.428571 | 0.071429 | 0.071429 | 0.428571 |
| CDa1 | 3 | 11 | 4 | 11 | 11 | 3 | 11 | 4 | 11 | 4 | 0.466667 | 0.052381 | 0.052381 | 0.466667 |
| CDa2 | 3 | 11 | 3 | 10 | 11 | 3 | 10 | 3 | 10 | 3 | 0.538462 | 0.016484 | 0.016484 | 0.538462 |

Different pairs of channel symbols within a set of symbols have a different contrast.

In the first embodiment shown in FIG. 4B, the symbols CS11, CS12, CS21, CS22 respectively the fraction of the total area having the highest value for the optical property (here the brightness) is 0.82, 0.17, 0.76 and 0.23. Hence the pair of symbols CS11, CS12 provides for a higher contrast (0.82/0.17=4.8) than the pair of symbols CS21, CS22 (0.76/0.23=3.3).

Accordingly pairs of symbols comprising a symbol from the first subset ST1 and the second subset ST2 can be identified, a first pair comprising primary symbols CS11, CS12 that have a large contrast, and a second pair of symbols comprising secondary symbols CS11, CS12 with less contrast.

According to a favourable embodiment, a relatively high overall contrast of the visually detectable pattern can be obtained by a method wherein the data elements are obtained by conversion of primary data elements using a contrast enhancement code, wherein each contrast enhancement code word comprises a sequence of contrast enhancement code bits that are representative for selection of a primary or a secondary symbol, wherein the contrast enhancement code words comprise more contrast enhancement code bits representative for a primary channel symbol than contrast enhancement code bits representative for a secondary channel symbol. The contrast enhancement code promotes that predominantly the primary symbols are selected that provide for a high contrast. Preferably the number of contrast enhancement code bits in the contrast enhancement code words representative for the first pair of channel symbols is at least 4 times as high as the number of contrast enhancement code bits in the contrast enhancement code words representative for the second pair of channel symbols.

The following tables show examples of such a contrast enhancement code. Herein a primary data element having a value in the range of 0x0 to 0xF is converted into a contrast enhancement code word, wherein each bit represents the choice for a particular pair of channel code words. The contrast enhancement code words comprise predominantly bits "0" that are representative for the pair of channel code words having the highest contrast.

The first table in FIG. 5A shows a conversion into 8-bit contrast enhancement code words.

The second table in FIG. 5B shows a conversion into 10-bit contrast enhancement code words. In this case for each code word the number of bits "0" representative for the first pair of channel symbols CS11, CS12 is 5 times as high as the number of contrast enhancement code bits "1" in the contrast enhancement code words representative for the second pair of channel symbols CS21, CS22.

The third table in FIG. 5C shows a conversion into 16-bit contrast enhancement code words. In this case for each code word the number of bits "0" representative for the first pair of channel symbols CS11, CS12 is 8 times as high as the number of contrast enhancement code bits "1" in the contrast enhancement code words representative for the second pair of channel symbols CS21, CS22.

In each of the tables, the contrast enhancement code words each have the same number of contrast enhancement code bits representative for the second pair of symbols. This has the advantage that the visually detectable pattern has a substantially constant contrast, independent of the embedded data.

In the second and the third table, for each contrast enhancement code word, contrast enhancement code bits representative for the second pair of channel symbols CS21, CS22 are separated by at least one contrast enhancement code bit representative for the first pair of channel symbols CS11, CS12.

In this way it is avoided that many tracks with channel symbols of the second pair are adjacent to each other. Therewith the apparent contrast is further improved, as the channel codes of the second pair appear less pronounced.

Figure 6:
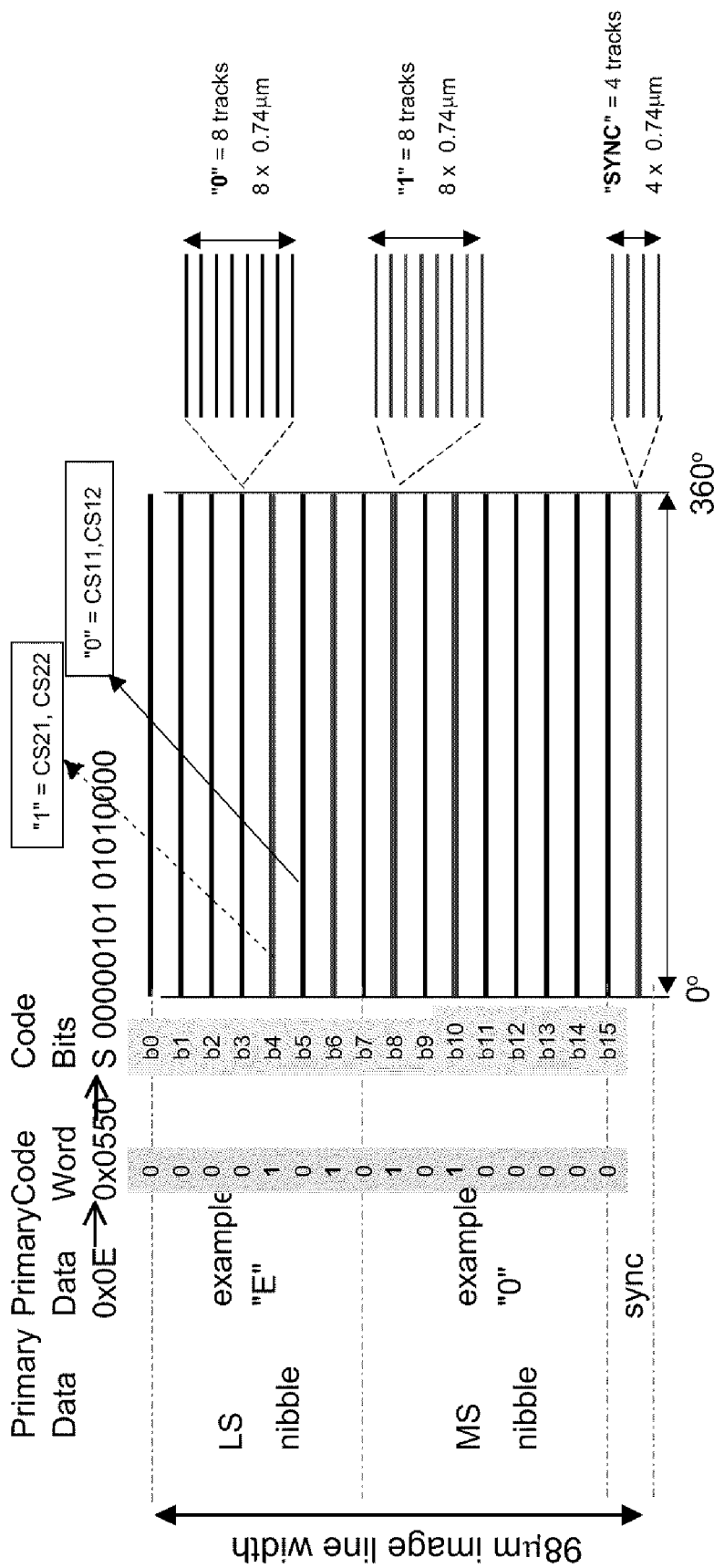
FIG. 6 shows for an embodiment in more detail how the embedded data is presented in the visually detectable pattern.

FIG. 6 shows how a single line of the visually detectable pattern is mapped at a plurality of tracks. In this case an image line is mapped at 16 groups of subsequent tracks, wherein, in this case, each group comprises a set of 8 tracks. In this example the individual tracks have a width of 0.74 µm, and the image line has a width of 98 µm. As illustrated in FIG. 6, an 8-bit primary data word is mapped at the visually detectable image. The two 4-bit nibbles of the 8-bit primary data word (here 0x0E for example) are each converted in a 8-bit contrast enhancement code word, using the first conversion table, so that the primary data word is represented by a 16-bit contrast enhancement code. For each of the 16 subsequent groups of tracks, a respective pair of channel symbol codes is selected to display the visually detectable pattern. For example, in the first group of tracks, the first pair of channel codes CS11, CS12 is used and in the fifth group of tracks the second pair of channel codes is used CS21, CS22.

Further one or more sync tracks may be included in the image line for example. The sync tracks for example comprise a sequence of symbols of the pair of secondary symbols. Alternatively a tertiary set of symbols that deviates from the primary and the secondary set of symbols may be used for this purpose, e.g. a 3T-8T/8T-3T pattern.

A further improvement of contrast can be obtained by using one of the other tables e.g. the 4 to 10 conversion table of FIG. 5B, or the 4 to 16 conversion table of FIG. 5C.

Figure 7:
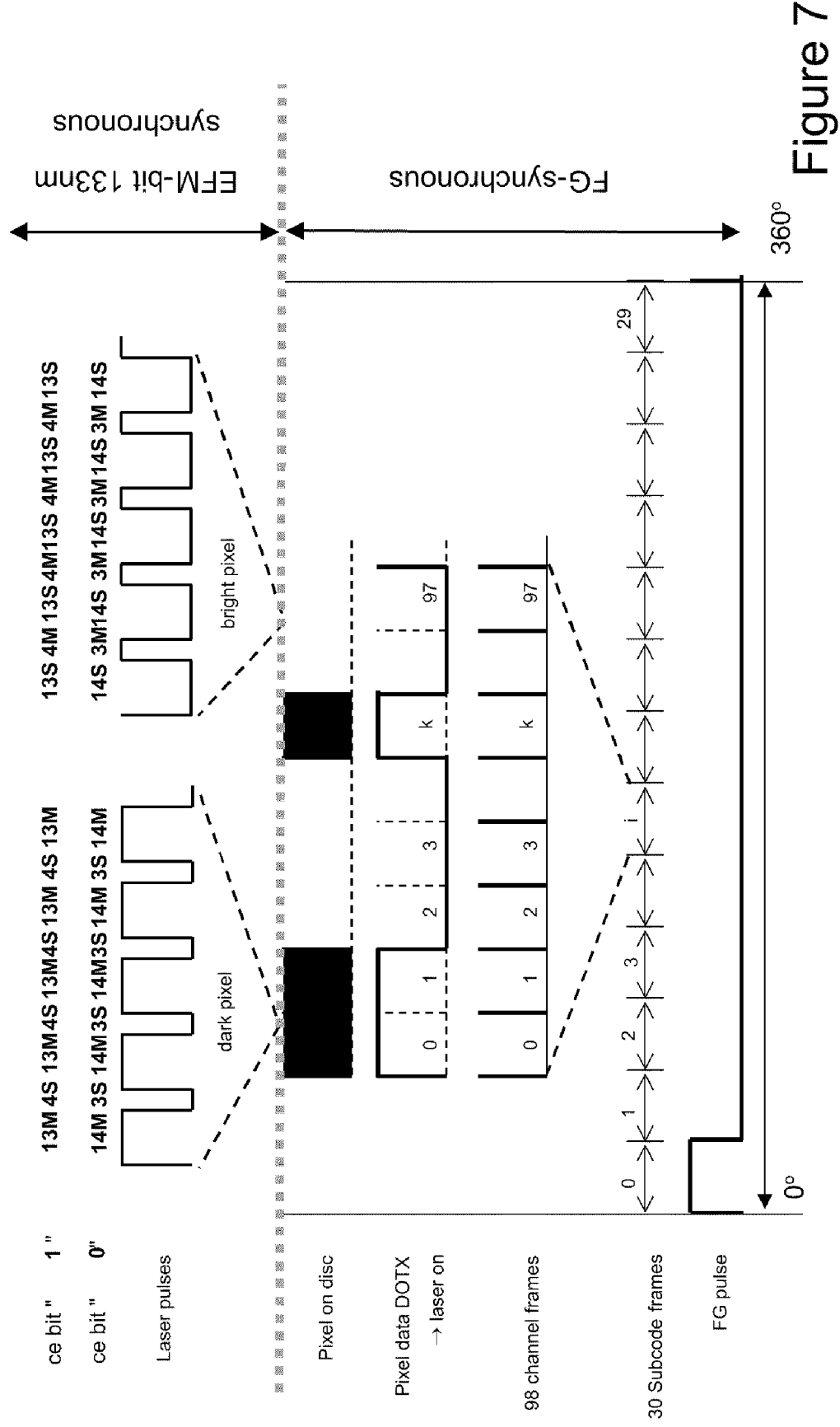
FIG. 7 shows a further detail of FIG. 6.

FIG. 7 shows how in this way 2940 pixels can be encoded utilizing the CD frame encoder hardware for example. As illustrated in FIG. 7, for this example for each rotation of the disc, 30 subcode frames, each comprising 98 channel are recorded, wherein each channel frame forms a pixel of the visually detectable pattern.

FIG. 7 also shows how for those tracks where the contrast enhancement code bit (ce-bit) is 0, the pixels are formed using the first pair of channel code words, i.e. in this case CS11 to represent bright pixels and CS12 to represent dark pixels. For those tracks where the contrast enhancement code bit (ce-bit) is 1, the pixels are formed using the first pair of channel code words, i.e. in this case CS21 to represent bright pixels and CS22 to represent dark pixels.

Figure 8:
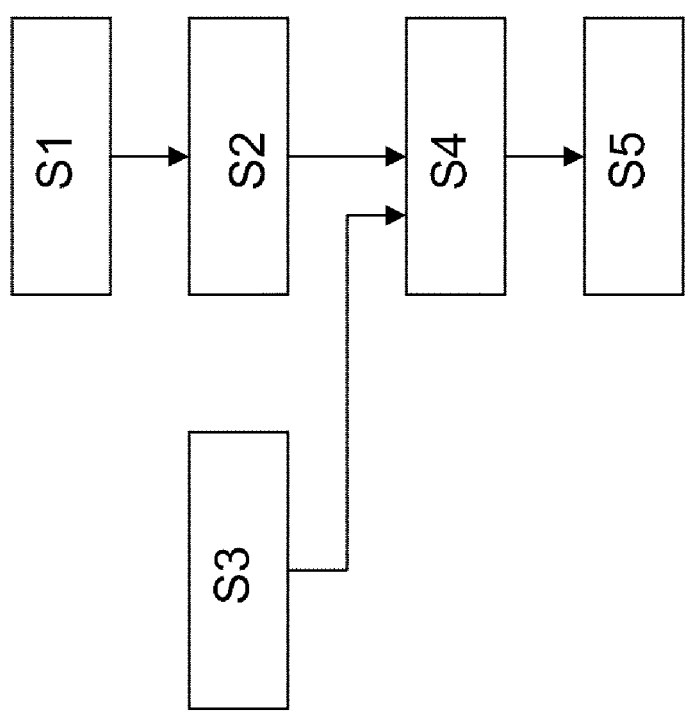
FIG. 8 shows a method for applying a visually detectable pattern with embedded data at a record carrier.

FIG. 8 shows a method of applying image data as a visually detectable pattern with at least one embedded data element at an optical record carrier.

In a step S1, the at least one data-element is obtained. The data-element is obtained for example via a user interface from a user, from a storage element of a device used to apply the image data, or by calculation of the device. This data-element is optionally converted using a contrast enhancement code in step S2, for example according to one of the conversion tables.

In step S3, the image data is obtained. The image data is obtained for example via a user interface from a user, from a storage element of a device used to apply the image data, or by calculation of the device. The at least one data-element to be embedded in the visually detectable pattern may be independent from the image data, but may otherwise be related to the image data, for example the at least one data element may be indicative for a structure of the visually detectable pattern.

For the purpose of retrieving the image as a digital representation from the visually detectable pattern, it is preferred that the at least one data element indicates a line number of the image. However, auxiliary data may be embedded in the visually detectable pattern, such as data indicative for the type of conversion table used in step S2, the contrast level, the version number of the format, and the power levels used for writing.

In step S4 a channel code is selected on the basis of the data to be embedded, and on the basis of the image data to be visualized as the visually detectable pattern. The image data determines the selection of the subset and the data to be embedded determines the selection of the symbol within the subset.

Subsequently in step S5 the selected one symbol is written to the optical record carrier.

It is noted that the order in which the selection of the symbol is made is not relevant. First a subset of symbols may be selected on the basis of the image data, and subsequently a selection may be made from this subset on the basis of the at least data element to be embedded. Alternatively, first a selection may be made on the basis of the data to be embedded and subsequently a selection on the basis of the image data.

FIG. 9 again shows the system of FIG. 1, here with the drive-module 20 in more detail. As shown therein, the drive-module 20 comprises a read/write head 21 to read optically detectable information from the record carrier 40 and to provide an output signal representative for the information read from the record carrier 40 to an RF processing circuit 26 and/or to write optically detectable information at the record carrier 40. The read/write head 21 forms a device for writing symbols, i.e. physically mapping the symbols, at the record carrier 40, and comprises for example a device for projecting a radiation beam modulated by a control signal at the record carrier 40. However other means may be used to apply an optically detectable pattern at the record carrier 40.

The read/write head 21 is movable relative to the record carrier 40 by means comprising a spindle motor 22 for rotating the record carrier 40 and further means, e.g. a slide and a radial actuator (not shown) for radially displacing the read/write head 21 relative to the record carrier 40. The relative movement of the read/write head 21 with respect to the record carrier 40 is controlled by a servo circuit 23. The RF processing circuit 26 decomposes the signal obtained from the read/write head 21 into a first output signal that is provided to a decoder circuit 27, which decodes the first output signal into a digital signal representative for the data stored on the record carrier 40. The RF processing circuit 26 provides a second output signal to an address detection circuit 29 that determines the address at the record carrier 40 that is currently accessed by the read/write head 21. The data obtained by decoder circuit 27 and the address determined by address detection circuit 29 is provided to general controller 32. With this information, the controller 30 controls the servo circuit 23.

Data is written on the record carrier 40 by an encoder 31, 32, a write strategy unit 33, a driver 24 and the read/write head 21. The encoding may include an error protection encoding 31 (e.g. Reed-Solomon) and a channel encoding 32 which is dependent on the medium used for the record carrier 40. (e.g. an EFM coding for CD, EFM+ for DVD and 17PP for BD). The encoded signal is provided to the write strategy unit 33 that calculates a required modulation of a signal to be sent to the read/write head 21 in order to optimally represent the encoded signal. This is dependent on the type of record carrier 40 used, e.g. whether the record carrier 40 comprises an active layer on the basis of a phase change material, a dye etc.

The driver 24 converts the output signal into a signal suitable to drive a write facility of the read/write head 21. Usually the write facility comprises a laser and a lens system for providing a focused beam on the record carrier 40. The actual power applied to the write facility is further regulated by a laser power controller 25. The laser power controller 25 monitors the intensity of the laser beam in response to the signal provided by the driver 24 and adjusts the driver 24 to compensate for temperature changes and temporal deterioration of the laser in the read/write head 21.

The components in the drive 20 forming the facility for physically mapping at least one embedded data element as a channel symbol onto the record carrier 40 may be substantially the same as those used for recording regular machine-readable data. As for the machine readable data, the visible pattern is generated at the recording layer 41 of the record carrier 40 by modulating an intensity of the laser beam from the read/write head 21 while providing a relative displacement between the read/write head 21 and the record carrier 40. Likewise the image data represented at the record carrier 40 and the at least one data-element embedded therein are written as channel symbols at the record carrier 40. Preferably the encoder 32 is reused for generating the sequence of channel symbols to be written, so that no additional hardware is required. Alternatively, a different encoder may be used for this purpose to have more flexibility. According to the present invention, the facility for physically mapping comprises a selection module 36 for selecting a channel symbol SC on the basis of the image data ID, and the at least one data element ED.

Figure 10:
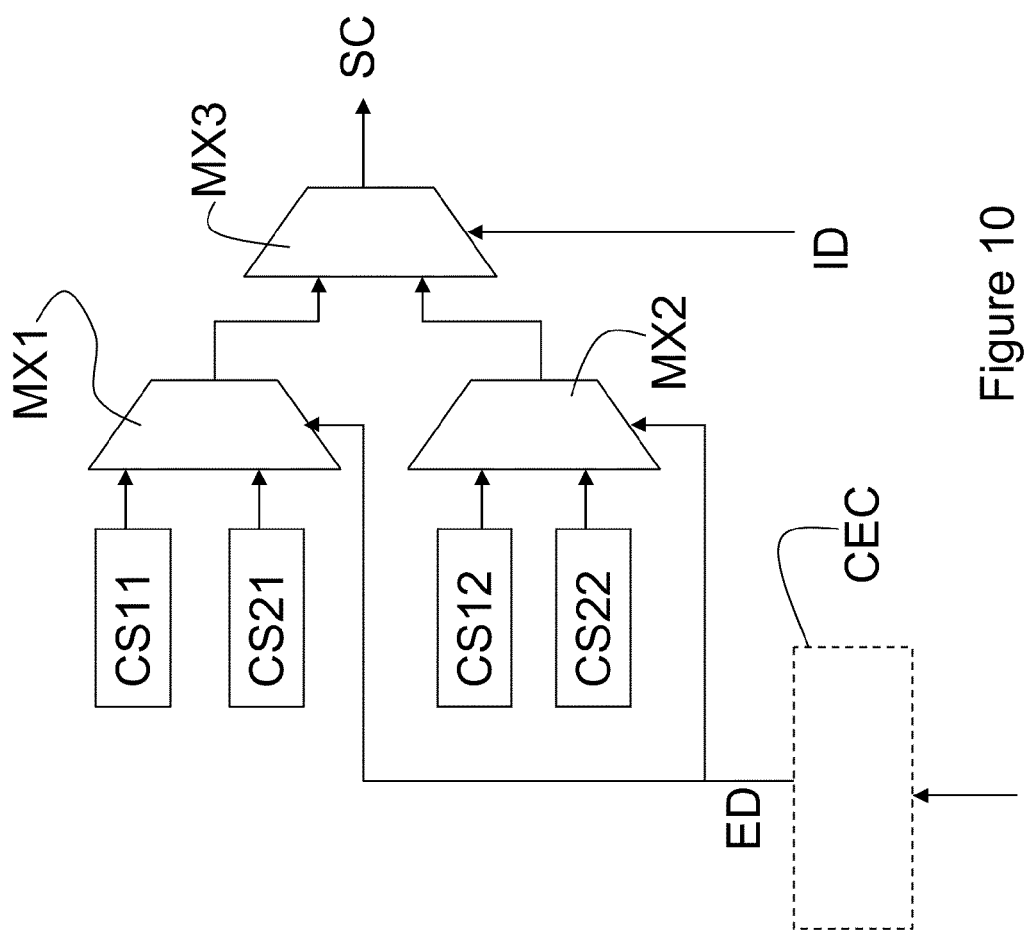
FIG. 10 shows a detail in a first embodiment of the apparatus of FIG. 9.

FIG. 10 shows a first embodiment of the selection module that may select a channel codeword SC, given an embedded data element ED, an image data element ID and a set of channel symbols, for example the channel symbols shown in FIG. 4C. The selection module shown therein comprises a set of storage elements that comprise the channel symbols CS11, CS21, CS12, CS22 from which a selection can be made. A first multiplexer MX1 is coupled to a pair of storage elements comprising channel codewords of the first subset ST1 and a second multiplexer MX2 is coupled to a pair of storage elements comprising channel codewords of the second subset ST2. A third multiplexer MX3 is coupled to the outputs of the first and the second multiplexer MX1, MX2. The embedded data element ED may be for example a bit of a primary data element, but it may alternatively be a bit of a contrast enhancement codeword that is derived from the primary data element, as indicated by the dashed box CEC representing a contrast enhancement code module. The contrast enhancement code module may for example apply a conversion table according to FIG. 5A, 5B or 5C. The image data element may be a bit that indicates whether the gray value to be mapped in the visually detectable pattern is higher or lower than a threshold value. On the basis of the embedded data element ED, the multiplexers MX1, MX2 respectively select a channel code word from the first and the second subset ST1, ST2. On the basis of the image data element, the third multiplexer MX3 selects one of the data elements from one of the multiplexers MX1, MX2, and offers the selected codeword SC at its output. The selected codeword may control the driver 24 immediately. Alternatively the selection module may provide an indication to the channel encoder 32, wherein the latter generates the channel symbol indicated by the selection module 36.

Figure 11:
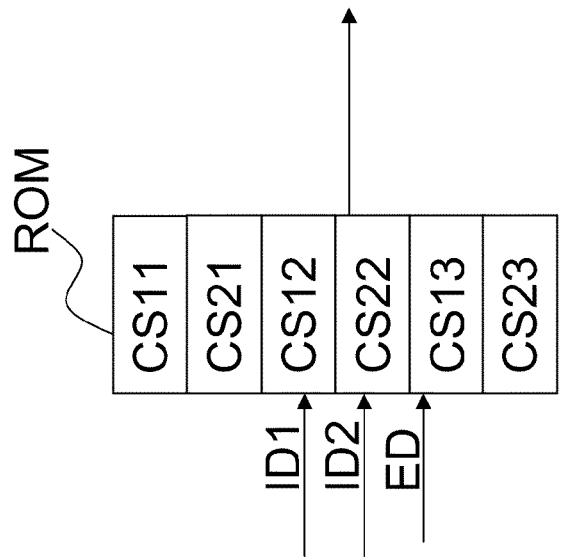
FIG. 11 shows a detail in a second embodiment of the apparatus of FIG. 9.

An alternative selection module is shown in FIG. 11. Therein the selection module comprises a lookup table, for example in the form of a ROM having stored therein a set of channel codewords, for example the channel code words according to the embodiment of FIG. 4A. The ROM is addressed by a first and a second most significant address line with the image data ID1, ID2 and by a third, least significant address line with the embedded data ED.

Figure 9:
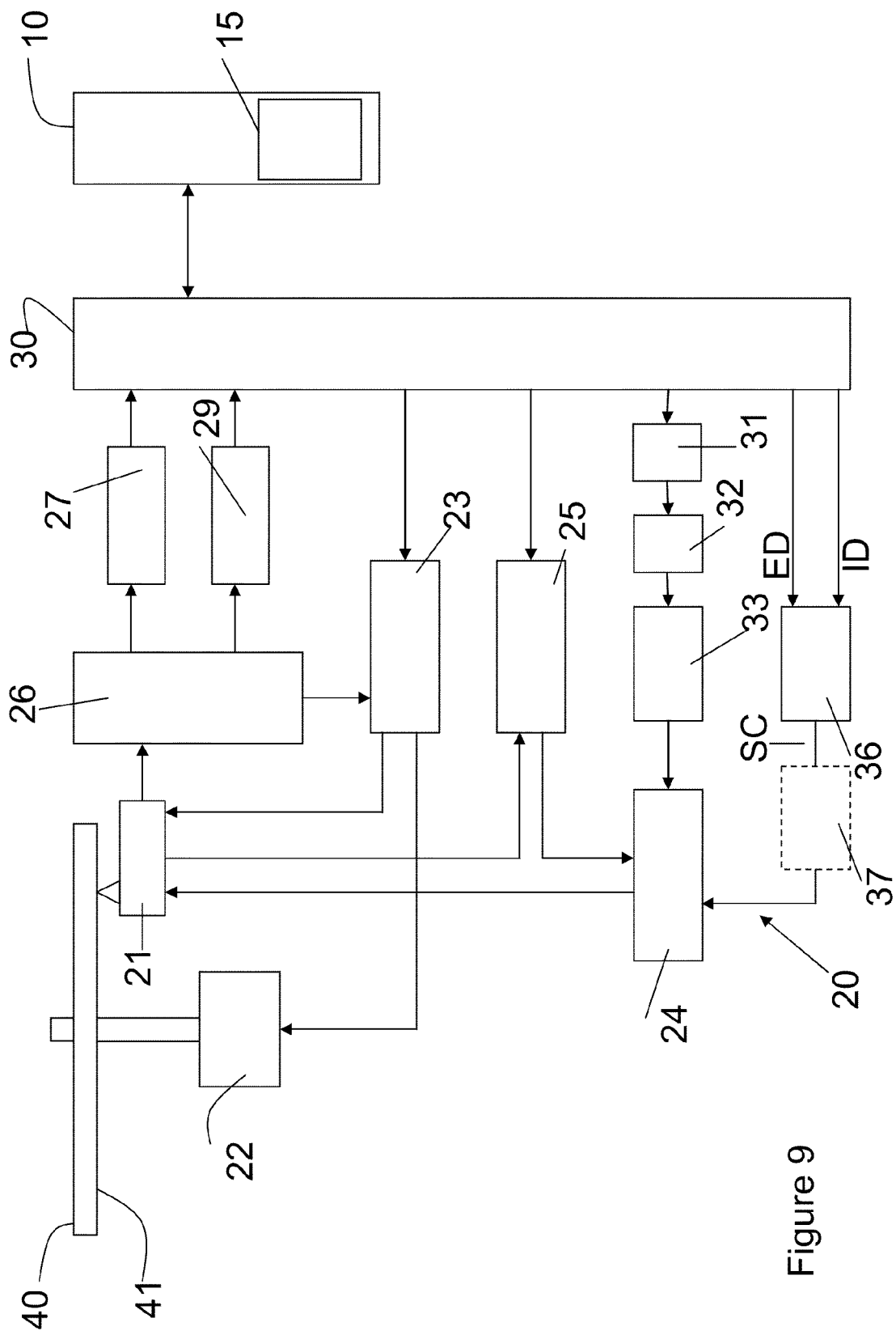
FIG. 9 shows an apparatus according to the invention for applying and for reading a visually detectable pattern with embedded data at a record carrier.

In the apparatus shown in FIG. 9, a further improvement of the contrast is achieved in that the device for writing the selected one symbol at the record carrier has a controllable setting for the peak power, and a facility for selecting the setting of the peak power in dependence on the subset associated with the symbol to be written. If for example a visually detectable pattern is written at the record carrier using the sets of symbols of FIG. 4C, and an increased writing power results in a lower value for the optical property, the symbols of the second set ST2 are written with a higher peak power than the symbols of the first subset ST1. If alternatively an increase in power would result in a higher value for the optical property, the symbols of the first subset ST1 would be written with the relatively high peak power. In both ways, a higher contrast of the visually detectable pattern is achieved. It is not a disadvantage that therewith the power level may deviate from what is optimal in data recording purposes, as only a subset of data symbols is used from what is used in regular data recording so that these symbols can still be detected reliably.

Figure 12A:
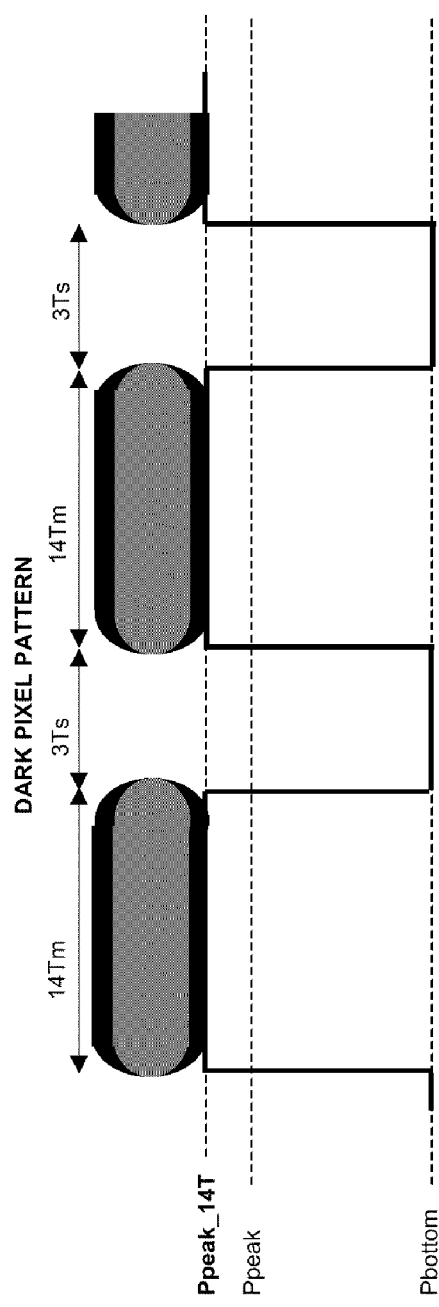
FIG. 12A illustrates a first aspect of a method according to the invention of writing a visually detectable pattern with embedded data at a record carrier.
Figure 12B:
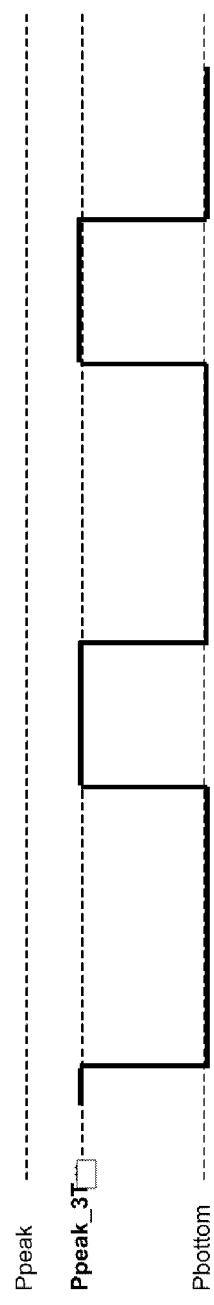
FIG. 12B illustrates a second aspect of a method according to the invention of writing a visually detectable pattern with embedded data at a record carrier.
Figure 12C:
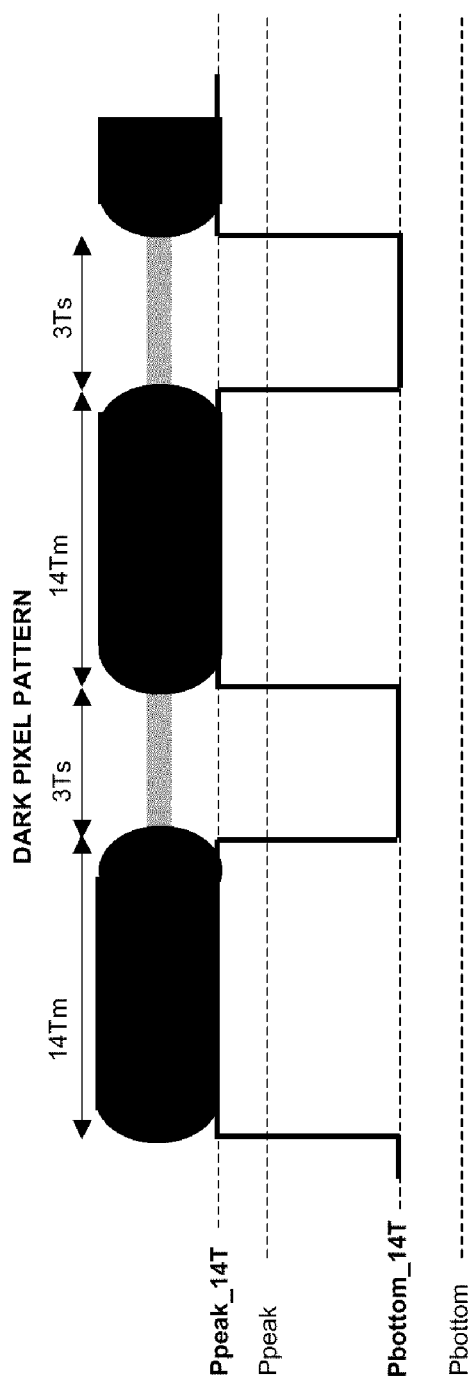
FIG. 12C illustrates a third aspect of a method according to the invention of writing a visually detectable pattern with embedded data at a record carrier.

This improvement is illustrated in FIGS. 12A-12C. The channel symbols representing a dark pixel are applied using higher peak power Ppeak_14T, see FIG. 12A. The visual image is recorded by laser pulses having dominating long marks CS12, CS22 (13Tm and 14Tm) for the dark pixels and having dominating long spaces CS11, CS21 (13Ts and 14Ts) for the bright pixels. The pulses used for writing the long marks have a high laser power, so therewith creating also wider marks. In grey the normal situation is shown for comparison. The increased width is schematically shown by the black marks. The increased width of the marks results in more image contrast. Similar, the marks representing bright pixels use a lower peak power Ppeak_3T as depicted in FIG. 12B. These marks become narrower resulting in more image contrast too. In grey the normal situation is shown. The decreased width is schematically shown by the black marks.

Moreover, it is also possible to increase the read level Pbottom_14T used to form the spaces in the symbols representing the dark pixels that these spaces get lower reflection. This illustrated in FIG. 12C. The dark pixel pulses use high laser bottom power resulting in narrow marks during the space period. In grey the new situation is shown. Note that the space reflection in this case may not drop below the slicer level. Otherwise confusion in the user data bit detection method might happen.

The apparatus shown in FIG. 9 may have an auto-pattern generator 37 indicated in dashed form that generates the desired pattern as a function of the symbol provided by the symbol selection module.

The apparatus shown in FIG. 9 is also suitable to read the embedded data in the visually detectable pattern.

The apparatus may decode the detected channel symbols and reconstruct the image data and the data embedded therein in a way analogous to the way that the channel symbols representing regular data are retrieved.

Figures 13A, 13B:
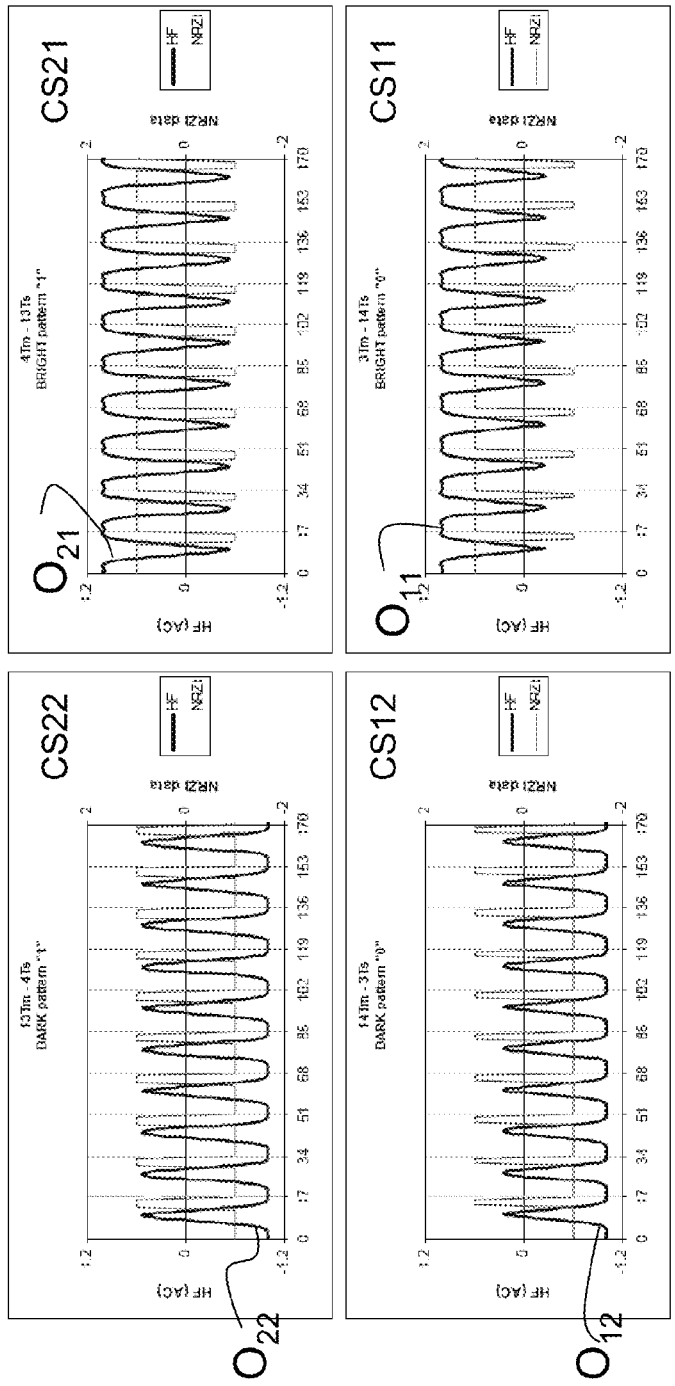
FIG. 13A shows a various signals obtained by a method of reading the record carrier according to the invention.
FIG. 13B shows various parameters that are extracted from these signals.

The visual detectable pattern has a resolution that is substantially lower than the resolution with which regular data is recorded. As illustrated in FIG. 7, a pixel of the visually detectable pattern may have a length of 0.1 mm for example. An EFM+ channel bit has a length of about 133 nm. Accordingly, an EFM+ channel symbol has a length of 17 channel bits, which equals to 0.0023 mm. Accordingly, a pixel extends over 44 channel symbols. It is advantageous if also the embedded data is present at a low resolution. In that case, the visually detectable pattern comprises a repeated pattern of channel symbols, for example over the full length of a pixel, which facilitates detection. This is illustrated in FIG. 13A. Therein the graphs shows by way of example the signal $O_{11}$, $O_{21}$, $O_{12}$ and $O_{22}$ generated by the read head for each of the symbols CS11, CS21, CS12 and CS22.

A relatively simple decoding means suffices to retrieve the image data as well as the embedded data from the visually detectable pattern at the record carrier. The table shown in FIG. 13B shows the value of various parameters for these signals.

In an example, the record carrier is rotated at 120 Hz, while 2940 pixels are arranged at a track. In that case, the pixels are scanned at a speed of 2.8 ms/pixel and the reflection should be sampled at a sampling frequency of at least 1 MHz. This is within the capability of state of the art ODD chips.

Figure 14:
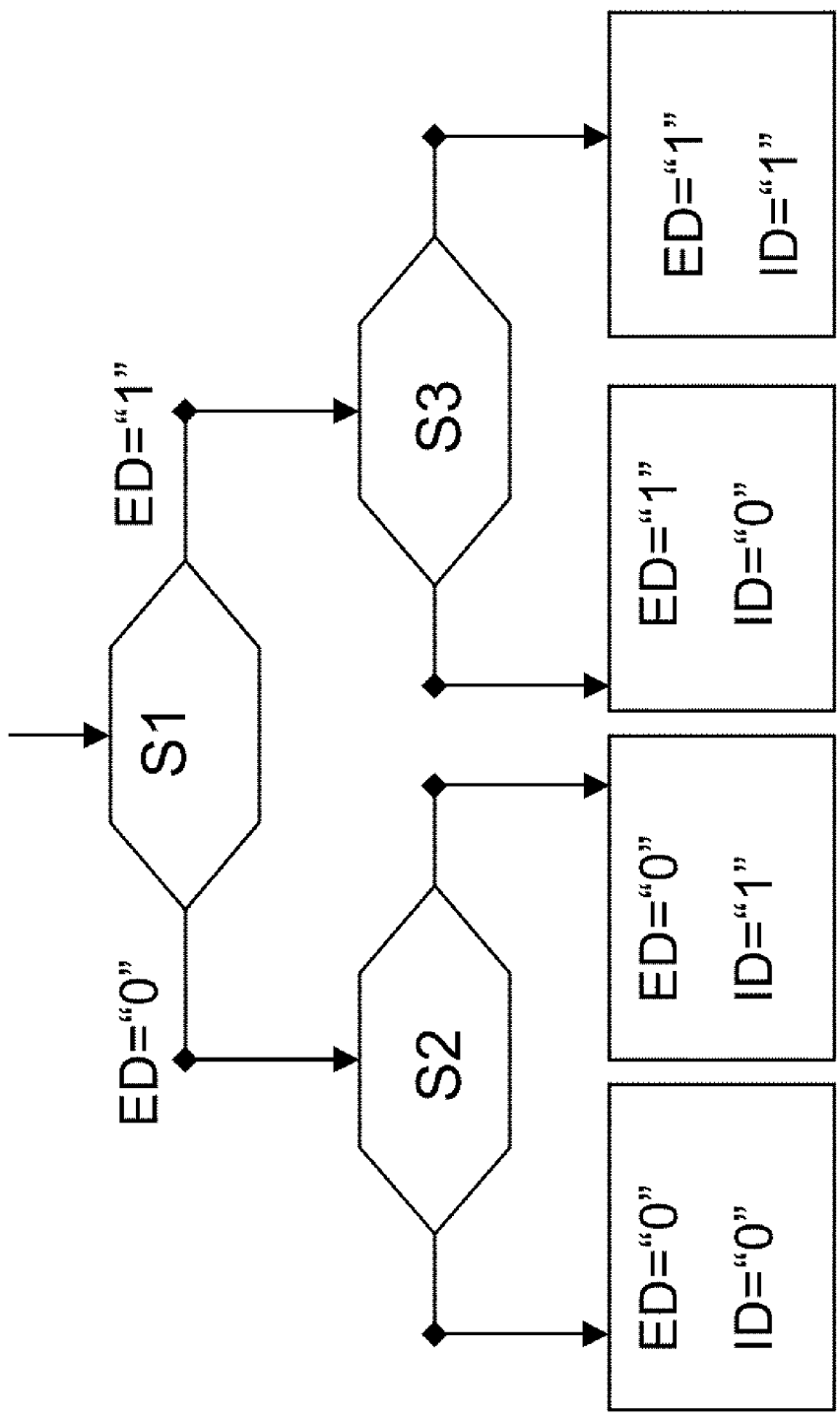
FIG. 14 illustrates a method of reading a record carrier according to the invention.

This can be used in the method illustrated in FIG. 14. In step S1 thereof, it is verified whether the asymmetry of the signal is greater than a threshold value. If that is the case, the embedded data element is classified as "0". Otherwise, the embedded data element is classified as "1". The reflection is measured to determine the image data in step S2 and S3. If the reflection is higher than a threshold, the image data ID is identified as "1", otherwise as "0". The threshold level in steps S2 and S3 may be different, taking into account that S2 is carried out after an ED="0" is identified and S3 is carried out after an ED="1" is identified. Alternatively, the image data ID and the embedded data may be determined in parallel. Alternatively or in combination other methods may be used to determine the image data and the embedded data, based on modulation, measurement of peak and bottom values for example.

In the examples presented above, the present invention is presented in particular for disc-shaped optical record carriers wherein the optical record carrier is scanned during writing and reading by the combination of a rotating movement of the record carrier and a radial movement of the read head. The invention is however equally applicable to other types of optical record carriers, e.g. card-shaped and a relative movement between the read/write-head and the record carrier may be realized in any other way, for example by an XY-table that moves the read/write-head or the record carrier.

In the claims, the word "comprising" does not exclude other elements or steps, and the indefinite article "a" or "an" does not exclude a plurality. A single component or other unit may fulfil the functions of several items recited in the claims. The mere fact that certain measures are recited in mutually different claims does not indicate that a combination of these measures cannot be used to advantage.

Various aspects of the invention may be applied independently. For example the measures described with reference to claims 10 and FIGS. 12A-12C may also be used if the plurality of channel symbols within a subset has a distance that is not substantially less than the distance between channel symbols of mutually different subsets. However, there is a clear synergy between the measures of claim 1, 2 and 10, as these measures in combination provide for an enhancement of the contrast better than the sum of the enhancement that would be obtained by the measures taken in isolation.

Likewise, the measures of claim 14, illustrated by FIGS. 13A, 13B are very suitable to read a record carrier according to the present invention. However, these measures could also be applied separately. Any reference signs in the claims should not be construed as limiting the scope.

It is noted that data and signal processing facilities, such as data encoding, data decoding, controlling a power of a radiation beam, controlling a relative movement between a targeted spot of radiation and a record carrier may be formed by dedicated hardware, but may alternatively be formed by a suitably programmed general purpose processor or a combination of both. A single processor may perform various functions.

The invention claimed is:

1. Method of applying image data as a visually detectable pattern with at least one embedded data element at an optical record carrier, comprising the step of physically mapping at least one channel symbol onto the record carrier, the channel symbol being selected from a set of mutually different channel symbols, the channel symbols each comprising an area of size s1 with a relatively low value v1 for an optical property and an area with size s2 with a relatively high value v2 for said optical property, the channel symbols being distributed over a plurality of subsets each having a plurality of channel symbols wherein the plurality of channel symbols within a subset have a distance that is substantially less than the distance between channel symbols of mutually different subsets, wherein the distance between two channel symbols is defined as the absolute difference between the ratios s1/(s1+s2), wherein the step of selecting comprises a step of determining a subset on the basis of the image data to be mapped in the visually detectable pattern and selecting one symbol from that subset on the basis of the at least one data symbol to be mapped.

2. Method according to claim 1, wherein the plurality of subsets of symbols is two, and wherein the first of the two subsets of symbols comprises symbols having a value for s1 less than s2, and the second of the two subsets of symbols comprises symbols having a value for s1 greater than s2, and wherein the symbols comply with the following relation:

$$\frac{MAX - MIN}{MAX + MIN} \geq 0.4, \text{wherein}$$

MAX=the minimum value of s2 for all symbols in the first subset and of s1 for all symbols in the second subset, and
MIN=the maximum value of s1 for all symbols in the first subset and of s2 for all symbols in the second subset.

3. Method according to claim 1, wherein said subsets comprise symbols having a runlength within a runlength range of a set of channel codewords used for storage of regular data at another part of the record carrier.

4. Method according to claim 1, wherein the subsets each comprise a primary symbol and a secondary symbol, and wherein a mutual distance between the primary symbols is greater than a mutual distance between the secondary symbols, wherein the at least one data element is obtained by conversion of a primary data element using a contrast enhancement code, wherein each contrast enhancement code word comprises a sequence of contrast enhancement code bits that are representative for selection of a primary or a secondary channel symbol, wherein the contrast enhancement code words comprise more contrast enhancement code bits representative for a primary channel symbol than contrast enhancement code bits representative for secondary channel symbols.

5. Method according to claim 4, wherein for each contrast enhancement code word contrast enhancement code bits representative for secondary channel symbols are separated by at least one contrast enhancement code bit representative for a primary channel symbol.

6. Method according to claim 4, wherein the contrast enhancement code words each have the same number of contrast enhancement code bits representative for the secondary symbols.

7. Method according to claim 1, wherein the at least one data element is indicative for a structure of the visually detectable pattern.

8. Method according to claim 7, wherein the at least one data element indicates a line number of the image.

9. Method according to claim 8, wherein the line number of an image line is represented by a first and a second contrast enhancement code word, wherein each contrast enhancement bit of the contrast enhancement code words is mapped at a plurality of subsequent tracks, and the image line extends over the set of tracks for all contrast enhancement bits.

10. Method according to claim 2, wherein the step of physically mapping at least one data element as a channel symbol onto the record carrier comprises the step of projecting an optical signal onto the record carrier, wherein the optical signal is modulated between a low peak power and a high peak power, and wherein a mutually different peak power is used for mapping channel symbols of the first and the second subset, to achieve that the relatively high value of the optical property of the symbols of the first subset is greater than the relatively high value of the optical property of the symbols of the second subset or that the relatively low value of the optical property of the symbols of the second subset is smaller than the relatively low value of the optical property of the symbols of the second subset.

11. Apparatus for writing image data as a visually detectable pattern with at least one embedded data element at an optical record carrier, comprising a facility for physically mapping the at least one data element as a channel symbol onto the record carrier, the channel symbol being selected from a set of mutually different channel symbols, the channel symbols each comprising an area of size s1 with a relatively low value v1 for an optical property and an area with size s2 with a relatively high value v2 for said optical property, the channel symbols being distributed over a plurality of subsets, each having a plurality of channel symbols wherein the plurality of channel symbols within a subset have a distance that is substantially less than the distance between channel symbols of mutually different subsets, wherein the distance between two channel symbols is defined as the absolute difference between the ratios s1/(s1+s2), wherein the selecting comprises determining a subset on the basis of the image data to be mapped in the visually detectable pattern and selecting one symbol from that subset on the basis of the at least one data symbol to be mapped.

12. Record carrier comprising a zone with a visually detectable pattern composed of channel symbols, the channel symbol being selected from a set of mutually different channel symbols, the channel symbols each comprising an area of size s1 with a relatively low value v1 for an optical property and an area with size s2 with a relatively high value v2 for said optical property, the channel symbols being distributed over a plurality of subsets each having a plurality of channel symbols wherein the plurality of channel symbols within a subset have a distance that is substantially less than the distance between channel symbols of mutually different subsets, wherein the distance between two channel symbols is defined as the absolute difference between the ratios s1/(s1+s2).

13. Method for reading an optical record carrier according to claim 12, comprising the steps
    a) converting a sequence of channel symbols arranged in the visually detectable pattern into a signal,
    b) identifying at least one symbol, and
    c) detecting to which subset of symbols the identified symbol corresponds, and
    d) detecting to which symbol of said subset the identified symbol corresponds,
    e) reconstructing image data on the basis of the detection in step c)
    f) reconstructing at least one data element on the basis of the detection in step d).

14. Method of reading image data according to claim 13, comprising the step of converting an optical signal representative for the image data into an electrical signal and determining at least one of the run length distribution, an asymmetry measure and the peak and bottom values of said electrical signal.

15. Apparatus for reading an optical record carrier according to claim 12, comprising
    a facility for converting a sequence of channel symbols arranged in the visually detectable pattern into a signal,
    a facility for identifying at least one symbol,
    a subset detecting facility for detecting to which subset of symbols the identified symbol corresponds,
    a symbol detecting facility for detecting to which symbol of said subset the identified symbol corresponds,
    a facility for reconstructing image data on the basis of the result of the subset detecting facility,
    a facility for reconstructing at least one data element on the basis of the result of the symbol detecting facility.

* * * * *